C. D. TISDALE.
Car Truck.
No. 40,889.
2 Sheets—Sheet 1.
Patented Dec. 8, 1863.
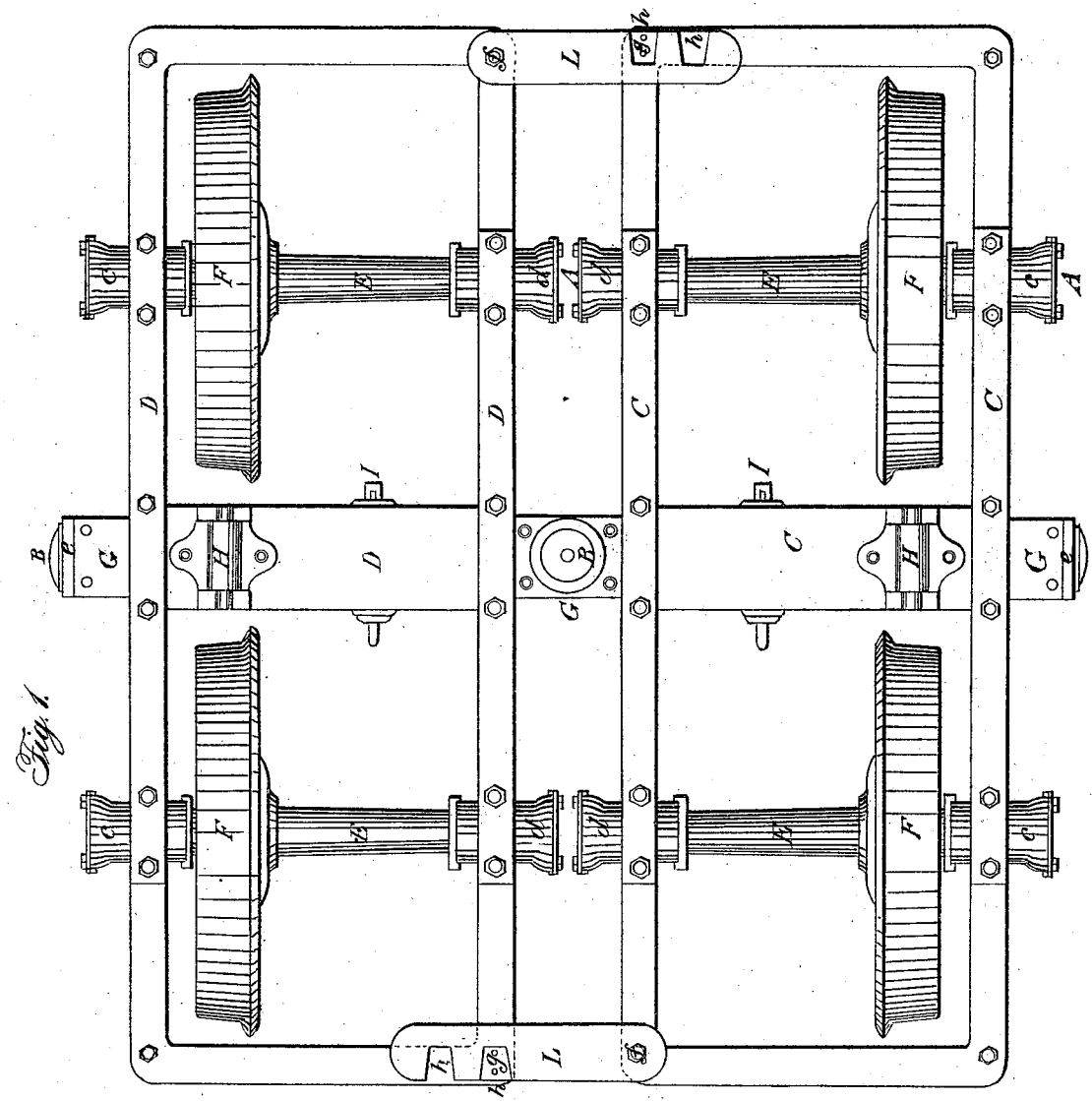
Witnesses:
R. H. Eddy
F. P. Hale Jr
Inventor:
Chas D. Tisdale.

C. D. TISDALE.
Car Truck.
No. 40,889.
2 Sheets—Sheet 2.
Patented Dec. 8, 1863.
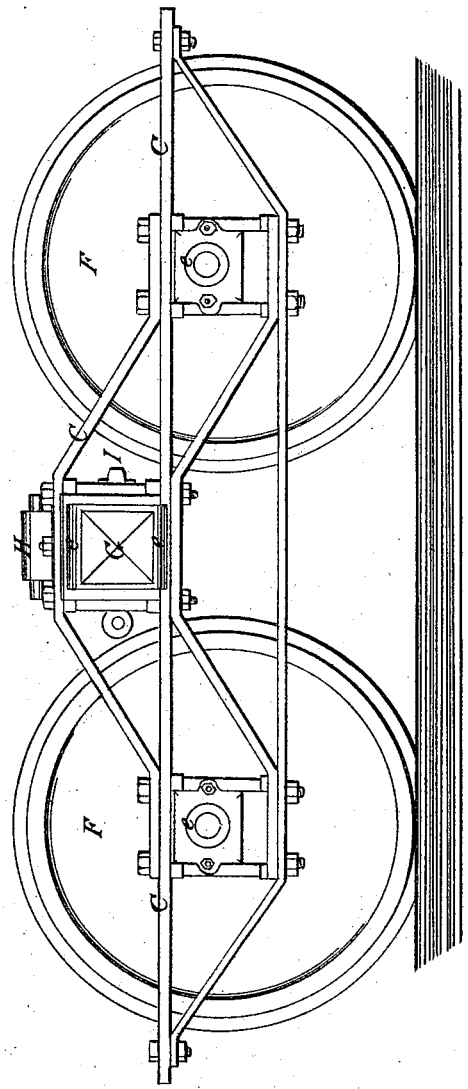
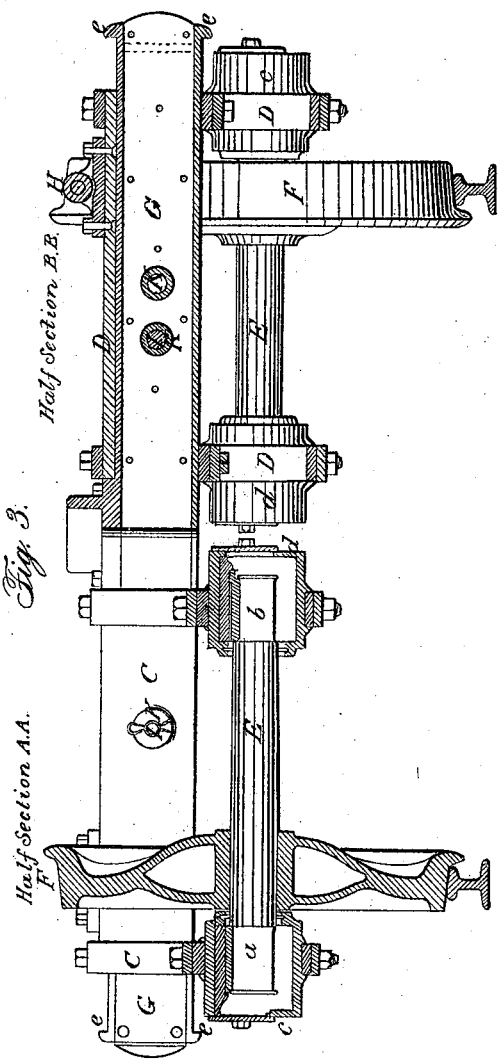
Witnesses:
R. N. Eddy.
F. P. Hale Jr.
Inventor:
Chas. D. Tisdale

UNITED STATES PATENT OFFICE.

CHARLES D. TISDALE, OF EAST BOSTON, MASSACHUSETTS, ASSIGNOR TO HIMSELF, B. W. TISDALE, AND M. B. BOYNTON.

IMPROVEMENT IN RAILWAY-CAR TRUCKS.

Specification forming part of Letters Patent No. 40,889, dated December 8, 1863.

*To all whom it may concern:*

Be it known that I, CHARLES D. TISDALE, a resident of East Boston, in the county of Suffolk and State of Massachusetts, have invented an Improved Railway-Carriage Truck, to be Used on Tracks of Different Gages; and I do hereby declare the same to be fully described in the following specification and represented in the accompanying drawings, of which—

Figure 1 denotes a plan or top view of it; Fig. 2, a side elevation; Fig. 3, two half-sections, one of which is taken through one of the wheels and its axle, while the other is taken through the king-bolt bar, by which the two frames of the truck or carriage are connected.

The nature of my invention, or the principal portion thereof, consists in a truck-frame as composed of a combination of two movable frames and a king-bolt bar, (by which they are connected,) or its equivalent, the whole being arranged and applied together substantially in manner and so as to operate as hereinafter described, the object of my said invention being to enable the truck or carriage to be adapted to run on either of two or more tracks of different gages.

In the drawings, C and D are two separate wheel-frames, each of which, as represented, supports two separate axles, E E, each of which is furnished with one railway-wheel, F. Each axle has two journals, *a b*, which are introduced into boxes *c d*, affixed to the frame C or D, as shown in Figs. 2 and 3.

Through the middles of the two frames C D a long bar, G, extends, each frame being so adapted to such bar as to be capable of sliding on it in directions longitudinally of the bar, and so as to enable the wheels of one frame to be brought either nearer to or farther from those of the other, those of one frame always retaining their parallelism to that of the other. The king-bolt or pin on which the truck swivels horizontally is to pass down through the central part of the bar G, the carriage-body, from which the king-bolt may proceed, resting on friction-rollers H H, arranged on the wheel-frames C D, as shown in the drawings.

The bar G may be composed of a stick of timber and a metallic tube encompassing it, or it may be made of either material, and, if desirable, may have a series of holes made horizontally and laterally through it on each half of it, there being a corresponding hole in each of those parts of the frames C D which encompass the bar. Under such circumstances a bolt may be run through each of the frames and the bar—that is, through the holes thereof—and thus confine the frame to the bar. The arrangement of the bolt-holes should be such as to enable the wheels of the two frames C D to be fixed at their proper distances asunder for tracks of two or more different gages, in order that the carriage may be adapted to run on any one of such tracks. In the drawings the bolts are shown at I I and their holes at K K. The bar G may also have a shoulder, *e*, at each end, as seen in the drawings, such being to arrest the outward movement of each of the frames C D on the bar. It will be evident that, instead of the said bar G, or, as a mechanical equivalent therefor, a frame or platform to rest on the two wheel-frames may be employed, it being so adapted to the said wheel-frames as to admit of their being slid underneath it, and either toward or away from one another, such substitute for the bar serving as a bridge to support the body of the carriage.

In order to protect the bar G from lateral strain, or the effects thereof, on either of the frames C D, when such strain may be produced by the shock of the wheel flange or flanges against a track-rail, I apply to the two frames, C D, and at each two of their adjacent ends, a latch-bar, L, or its mechanical equivalent, the said bar being held to one frame by a pin, *f*, on which it may turn horizontally. The other frame is provided with a similar pin or projection, *g*, on which the bar may lock by one of a series of notches, *h h*, made on the bar. By means of the latch-bars and their pins the lateral strain induced by the blow of a wheel when moved horizontally against such rail will be borne by both of the wheel-frames without detriment to their bar G.

What I claim as my invention is—

1. The combination of the two separate wheel-frames C D and the king-bolt bar G, or its mechanical equivalent, the whole being applied together and to the wheels substantially in manner and so as to operate as and for the purpose hereinafter specified.

2. The combination of the said separate wheel-frames C D and their king-bolt bar G, with means substantially as described—viz., the latch-bars L and their pins $f\ g$—for connecting and disconnecting each two adjacent ends of said wheel-frames, the purpose of connecting them being as hereinbefore stated.

3. The combination of the wheel-frames C D and their bar G with the bolts I I and their holes K K, or their mechanical equivalent, applied to the frames and bar, the same being for the purpose of fixing the frame to the bar in order to preserve the wheels in their true positions with respect to the railway-track.

4. The bar G, as provided with one or more shoulders, $e$, at each end, when the said bar is combined with two wheel-frames, C D, applied to it and supporting the wheel-axles, substantially as set forth.

C. D. TISDALE.

Witnesses:
R. H. EDDY,
F. P. HALE, Jr.